United States Patent
Saudagar et al.

(10) Patent No.: US 12,289,481 B2
(45) Date of Patent: Apr. 29, 2025

(54) SYSTEM, METHOD AND COMPUTER-READABLE MEDIUM FOR DATA SEARCH

(71) Applicant: 17LIVE Japan Inc., Tokyo (JP)

(72) Inventors: Abid Saudagar, Tokyo (JP); Hardik Taneja, Tokyo (JP); Hemanth Kumar Ajaru, Tokyo (JP)

(73) Assignee: 17LIVE Japan Inc., Tokyo (JP)

( * ) Notice: Subject to any disclaimer, the term of this patent is extended or adjusted under 35 U.S.C. 154(b) by 9 days.

(21) Appl. No.: 18/334,177

(22) Filed: Jun. 13, 2023

(65) Prior Publication Data

US 2024/0064343 A1     Feb. 22, 2024

(30) Foreign Application Priority Data

Aug. 16, 2022 (JP) ................................ 2022-129779

(51) Int. Cl.
*H04N 21/232*     (2011.01)
*H04N 21/239*     (2011.01)
*H04N 21/8405*     (2011.01)

(52) U.S. Cl.
CPC ....... *H04N 21/232* (2013.01); *H04N 21/2393* (2013.01); *H04N 21/8405* (2013.01)

(58) Field of Classification Search
CPC ............. H04N 21/232; H04N 21/2393; H04N 21/8405; H04N 21/2187
USPC ....................................................... 725/115
See application file for complete search history.

(56) References Cited

U.S. PATENT DOCUMENTS

| 10,891,673 B1* | 1/2021 | Sawaf | G06F 16/3344 |
| 2021/0201373 A1* | 7/2021 | Trinh | G06V 10/758 |
| 2022/0078205 A1* | 3/2022 | Bjarnason | H04L 63/1425 |
| 2022/0245362 A1* | 8/2022 | Nizar | G06F 40/216 |

FOREIGN PATENT DOCUMENTS

| CN | 113934830 A | 1/2022 |
| CN | 114048351 A | 2/2022 |
| CN | 114265926 A | 4/2022 |
| CN | 114493783 A | 5/2022 |
| CN | 114661928 A | 6/2022 |
| JP | 2019-164617 A | 9/2019 |
| WO | 2022/050060 A1 | 3/2022 |

OTHER PUBLICATIONS

Notification of Reasons for Refusal dated Jan. 20, 2023, issued in corresponding Japanese Patent Application No. 2022-129779 with English translatin (14 pgs.).

* cited by examiner

*Primary Examiner* — Adil Ocak
(74) *Attorney, Agent, or Firm* — Chun-Ming Shih; HDLS IPR SERVICES

(57) ABSTRACT

The present disclosure relates to a system, a method and a computer-readable medium for live streaming data search. The method includes receiving a search word, converting the search word into a search vector, receiving an attribute vector matching the search vector, and providing information of a first live streaming program corresponding to the attribute vector. The attribute vector varies according to contents of the first live streaming program while the first live streaming program is being distributed. The present disclosure can deliver contextual search results and text search results simultaneously in a real time manner.

7 Claims, 8 Drawing Sheets

Search interface

<Text matching> lipstick09    Search

| Stream ID | Streamer name | Bio | Tag | Region |
|---|---|---|---|---|
| S1 | lipstick0907 | ... | #music, #guitar | Japan |

<Contextual matching>

| Stream ID | Streamer name | Bio | Tag | Region |
|---|---|---|---|---|
| S2 | SN2 | ... lip artist ... | #cosmetic #makeup | Japan |
| S3 | SN3 | ... YSL brand ... | ... | US |
| S4 | SN4 | guitar artist | #lipstick | US |

FIG. 5

Mix text table 316

| Stream ID | Streamer name | Region | Bio | Gender | Tags | Mix text |
|---|---|---|---|---|---|---|
| S1 | hklive | JP | I am a singer | male | fun gaming | hklive JP I am singer male fun gaming |
| S2 | ... | ... | ... | ... | ... | ... |

SBERT conversion

Attribute vector database 204

| Stream ID | Attribute vector |
|---|---|
| S1 | [0.43 0.45 0.87 ............] ( 384 × 1 dimension ) |
| S2 | ... |

FIG. 6

Search interface

<Text matching> lipstick09  Search

| Stream ID | Streamer name | Bio | Tag | Region |
|---|---|---|---|---|
| No matching | | | | |

<Contextual matching>

| Stream ID | Streamer name | Bio | Tag | Region |
|---|---|---|---|---|
| S2 | SN2 | … lip artist … | #cosmetic #makeup | Japan |
| S3 | SN3 | … YSL brand … | … | US |
| S4 | SN4 | guitar artist | #lipstick | US |

FIG. 8

SYSTEM, METHOD AND COMPUTER-READABLE MEDIUM FOR DATA SEARCH

CROSS-REFERENCE TO RELATED APPLICATIONS

This application is based on and claims the benefit of priority from Japanese Patent Application Serial No. 2022-129779 (filed on Aug. 16, 2022), the contents of which are hereby incorporated by reference in its entirety.

TECHNICAL FIELD

The present disclosure relates to data search and, more particularly, to live streaming data search.

BACKGROUND

Real time data on the Internet, such as live streaming programs, has become popular in our daily life. There are various platforms or providers providing the service of real time data accessing, and the competition is fierce. Searching is an important feature for a platform. It is important for a content provider to efficiently, precisely, and vibrantly provide its users or viewers the contents they search for. Good search function can help retain the viewers on the platform as long as possible.

Chinese patent application CN114048351A discloses a method for text-video retrieval.

SUMMARY

A method according to one embodiment of the present disclosure is a method for live streaming data search being executed by one or a plurality of computers, and includes: receiving a search word, converting the search word into a search vector, receiving an attribute vector matching the search vector, and providing information of a first live streaming program corresponding to the attribute vector. The attribute vector varies according to contents of the first live streaming program while the first live streaming program is being distributed.

A system according to one embodiment of the present disclosure is a system for live streaming data search that includes one or a plurality of processors, and the one or plurality of computer processors execute a machine-readable instruction to perform: receiving a search word, converting the search word into a search vector, receiving an attribute vector matching the search vector, and providing information of a first live streaming program corresponding to the attribute vector. The attribute vector varies according to contents of the first live streaming program while the first live streaming program is being distributed.

A computer-readable medium according to one embodiment of the present disclosure is a non-transitory computer-readable medium including a program for live streaming data search, and the program causes one or a plurality of computers to execute: receiving a search word, converting the search word into a search vector, receiving an attribute vector matching the search vector, and providing information of a first live streaming program corresponding to the attribute vector. The attribute vector varies according to contents of the first live streaming program while the first live streaming program is being distributed.

BRIEF DESCRIPTION OF THE DRAWINGS

FIG. 5 shows an exemplary search interface in accordance with some embodiments of the present disclosure.

FIG. 6 shows an exemplary data structure in accordance with some embodiments of the present disclosure.

FIG. 8 shows an exemplary search interface in accordance with some embodiments of the present disclosure.

DETAILED DESCRIPTION

Conventional search methods or systems for live data on the internet face several challenges that need to be addressed.

Conventional search methods only perform text matching between the search keyword initiated by a viewer and predetermined attributes or tags of live data. Predetermined attributes or tags of live data can be, for example, a live streaming program's streamer profile (such as streamer name) or streaming type, which are input by the streamer and are fixed during the live streaming program. Therefore, conventional search methods cannot provide the search result in a real time manner. Conventional search methods cannot provide search results of contextual matching between the search keyword and contents of live streaming programs that vary in a real time manner.

Figure 1:
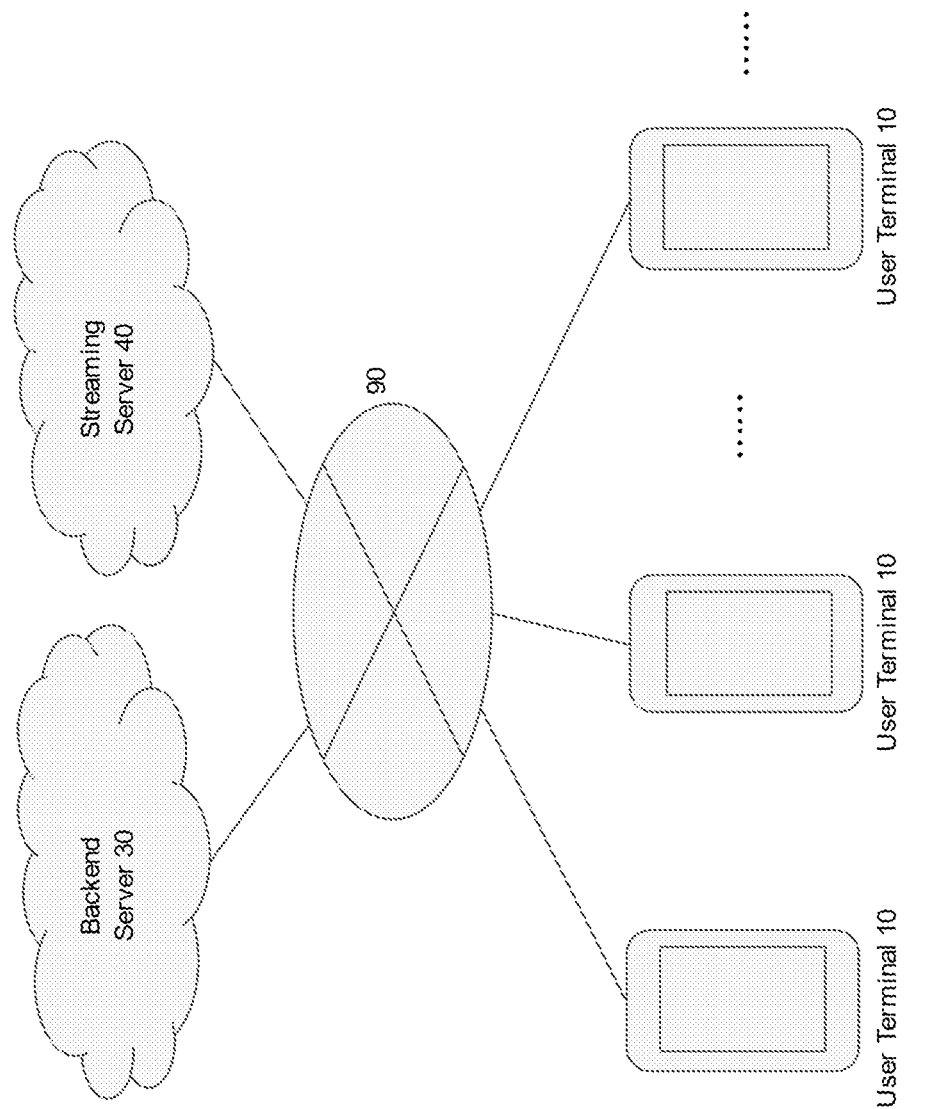
FIG. 1 shows a schematic configuration of a communication system according to some embodiments of the present disclosure.

FIG. 1 shows a schematic configuration of a communication system according to some embodiments of the present disclosure.

The communication system 1 may provide a live streaming service with interaction via a content. Here, the term "content" refers to a digital content that can be played on a computer device. In other words, the communication system 1 enables a user to participate in real-time interaction with other users on-line. The communication system 1 includes a plurality of user terminals 10, a backend server 30, and a streaming server 40. The user terminals 10, the backend server 30 and the streaming server 40 are connected via a network 90, which may be the Internet, for example. The backend server 30 may be a server for synchronizing interaction between the user terminals and/or the streaming server 40. In some embodiments, the backend server 30 may be referred to as the server of an application (APP) provider. The streaming server 40 is a server for handling or providing streaming data or video data. In some embodiments, the backend server 30 and the streaming server 40 may be independent servers. In some embodiments, the backend server 30 and the streaming server 40 may be integrated into one server. In some embodiments, the user terminals 10 are client devices for the live streaming service. In some embodiments, the user terminal 10 may be referred to as viewer, streamer, anchor, podcaster, audience, listener or the like. Each of the user terminal 10, the backend server 30, and the streaming server 40 is an example of an information-processing device. In some embodiments, the streaming may be live streaming or video replay. In some embodiments, the streaming may be audio streaming and/or video streaming. In some embodiments, the streaming may include contents such as online shopping, talk shows, talent shows, entertainment events, sports events, music videos, movies, comedy, concerts or the like.

Figure 2:
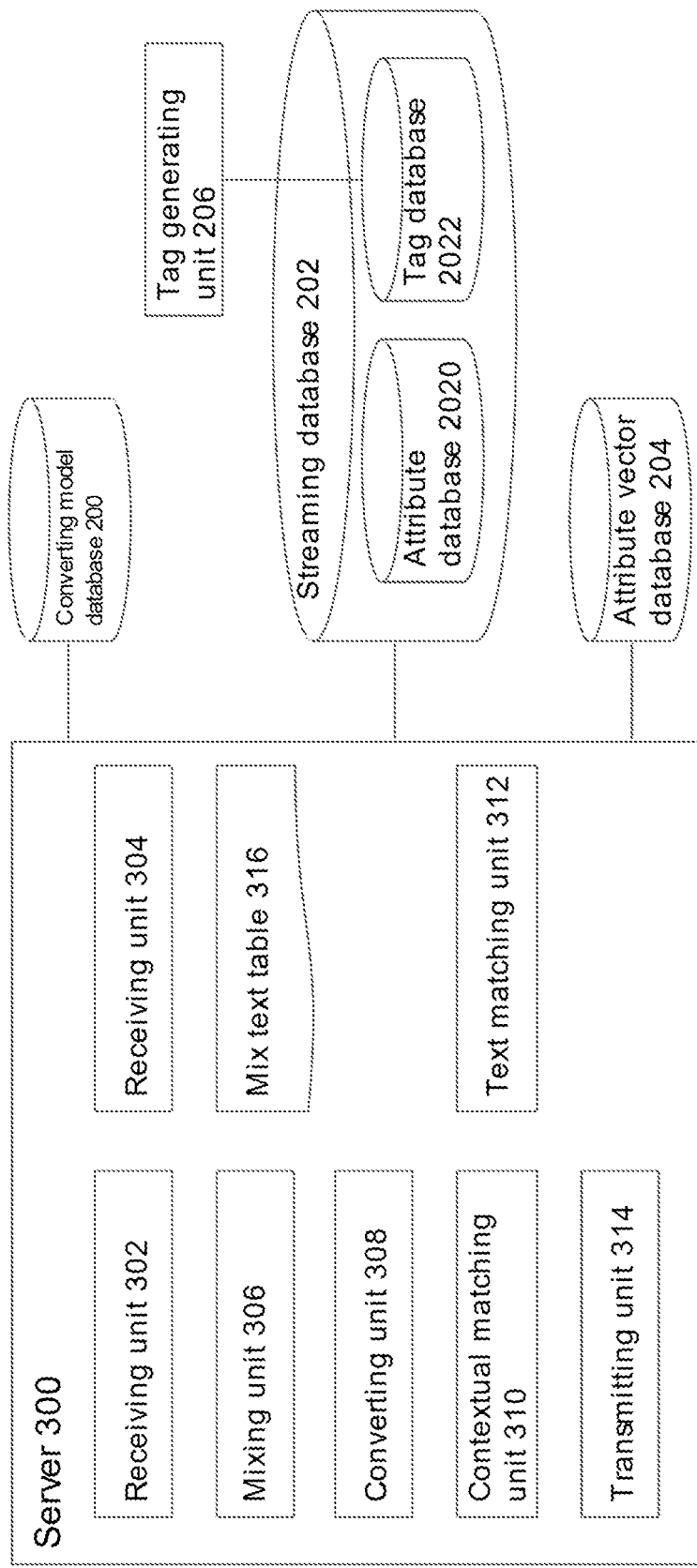
FIG. 2 shows an exemplary block diagram of a server in accordance with some embodiments of the present disclosure.

FIG. 2 shows an exemplary block diagram of a server in accordance with some embodiments of the present disclosure.

The server 300 includes a receiving unit 302, a receiving unit 304, a mixing unit 306, a converting unit 308, a contextual matching unit 310, a text matching unit 312, a transmitting unit 314 and a mix text table 316. The server 300 communicates with a converting model database 200, a streaming database 202 and an attribute vector database 204. The streaming database 202 includes an attribute database 2020 and a tag database 2022. The tag database 2022 communicates with a tag generating unit 206.

The receiving unit 302 is configured to receive data or information from a user terminal. For example, the receiving unit 302 may receive a search request such as a search keyword from a user terminal. The search keyword may be input by a user of the user terminal. The user could be a viewer of a live streaming platform searching for a live streaming program. The search keyword may be input on or through a search interface or a page of a live streaming application installed on the user terminal. The search keyword may be in text form.

The receiving unit 304 is configured to receive data or information of live streaming programs. The receiving unit 304 is configured to receive tags of live streaming programs from the streaming database 202 (or from the tag database 2022). In some embodiments, the tags of a live streaming program vary according to contents of the live streaming program in a real time manner. In some embodiments, the tags of a live streaming program vary according to contents of the live streaming program while the live streaming program is being distributed. The distribution scenarios may include distribution from the streamer to the streaming server, distribution from the streaming server to the viewer, or distribution from the streamer to the viewer. The receiving unit 304 receives tags of a live streaming program in a real time manner according to contents of the live streaming program. The tags may be in text form.

The receiving unit 304 is also configured to receive attribute data (or attribute text) of (or corresponding to) live streaming programs from the streaming database 202 (or from the attribute database 2020). The attribute data may be in text form. The attribute data of a live streaming program may include information such as stream ID, streamer name, streamer region, streamer bio, or streamer gender corresponding to the live streaming program. The attribute data may be input by the streamer of the live streaming program. The attribute data may be determined by the backend server or by the streaming server according to historical or real-time behaviors of the streamer of the live streaming program.

The mixing unit 306 is configured to generate a mix text according to the tags of the live streaming program and the attribute data of the live streaming program. In some embodiments, the mixing could be alignment or arrangement of various text-form data. The generated mix text would be stored in the mix text table 316. In some embodiments, there may be one or more mix text for each live streaming program. Example of contents in the mix text table 316 is shown in FIG. 6. A mix text may vary in a real time manner according to the corresponding tag or attribute data. A mix text may vary according to contents of the corresponding live streaming program while the live streaming program is being distributed.

The converting unit 308 is configured to convert text-form data (such as a text sentence) into vector-form data (such as a vector having various numbers as the elements). The converting unit 308 accesses the converting model database 200 for suitable model(s), such as a Bidirectional Encoder Representations from Transformers (BERT) or a Sentence-BERT (SBERT) word embedding model, for the converting process.

For example, the converting unit 308 converts the search keyword into a search vector, which may be used for subsequent searching processes. For example, the converting unit 308 converts a mix text of a live streaming program into an attribute vector, which corresponds to the live streaming program. The converting process may be performed in a real time manner such that, whenever the mix text varies, the corresponding attribute vector varies accordingly. The attribute vector may vary according to contents of the corresponding live streaming program while the live streaming program is being distributed. The attribute vector would be stored in the attribute vector database 204. In some embodiments, the converting unit 308 converts the mix texts for all available live streaming programs into their respective attribute vectors, and store the attribute vectors into the attribute vector database 204.

The contextual matching unit 310 is configured to perform contextual matching processes between the search vector and the attribute vectors stored in the attribute vector database 204. In some embodiments, the matching process may be or may include a K-Nearest Neighbors (KNN) search process. The contextual matching unit 310 delivers live streaming programs whose attribute vectors result in high matching values (or high correlation values/high matching scores) in the matching processes.

The text matching unit 312 is configured to perform text matching processes between the search keyword and the attribute texts of live streaming programs. The matching process may be or may include a text matching or a fuzzy text matching process. For example, text matching tools or fuzzy text matching tools provided by Elasticsearch may be utilized. The text matching unit 312 delivers live streaming programs whose attribute texts result in high matching values (or high correlation values/high matching scores) in the matching processes.

The transmitting unit 314 is configured to provide information of live streaming programs to a user terminal. For example, the transmitting unit 314 provides information of live streaming programs according to the contextual matching results and/or the text matching results, in response to a search request from the user terminal.

The converting model database 200 is configured to store models for converting text-form data into vector-form data, such as SBERT or BERT models. In this embodiment, the converting model database 200 is deployed outside the server 300. In some embodiments, the converting model database 200 could be deployed within the server 300.

The streaming database 202 includes the attribute database 2020 and the tag database 2022.

The attribute database 2020 is configured to store attribute data of live streaming programs. The attribute data could be received from user terminals (such as user terminals of streamers) or from a server (such as a streaming server or a backend server). In this embodiment, the attribute database 2020 is deployed outside the server 300. In some embodiments, the attribute database 2020 could be deployed within the server 300.

The tag database 2022 is configured to store tag data of live streaming programs. The tag data could be received from the tag generating unit 206. In this embodiment, the tag database 2022 is deployed outside the server 300. In some embodiments, the tag database 2022 could be deployed within the server 300.

The tag generating unit 206 is configured to generate tags for live streaming programs in a real time manner. The tag generating unit 206 generates tags for a live streaming program according to contents of the live streaming program while the live streaming program is being distributed. Generating tags for a live streaming program may involve an image recognizing process, a motion recognizing process and/or a sound recognizing process performed with respect to the live streaming program. In this embodiment, the tag generating unit 206 is deployed outside the server 300. In some embodiments, the tag generating unit 206 could be deployed within the server 300.

The attribute vector database 204 is configured to store attribute vectors of live streaming programs that are generated by the converting unit 308. In this embodiment, the attribute vector database 204 is deployed outside the server 300. In some embodiments, the attribute vector database 204 could be deployed within the server 300. In some embodiments, the attribute vector database 204 resides in an Elasticsearch server.

Figure 3:
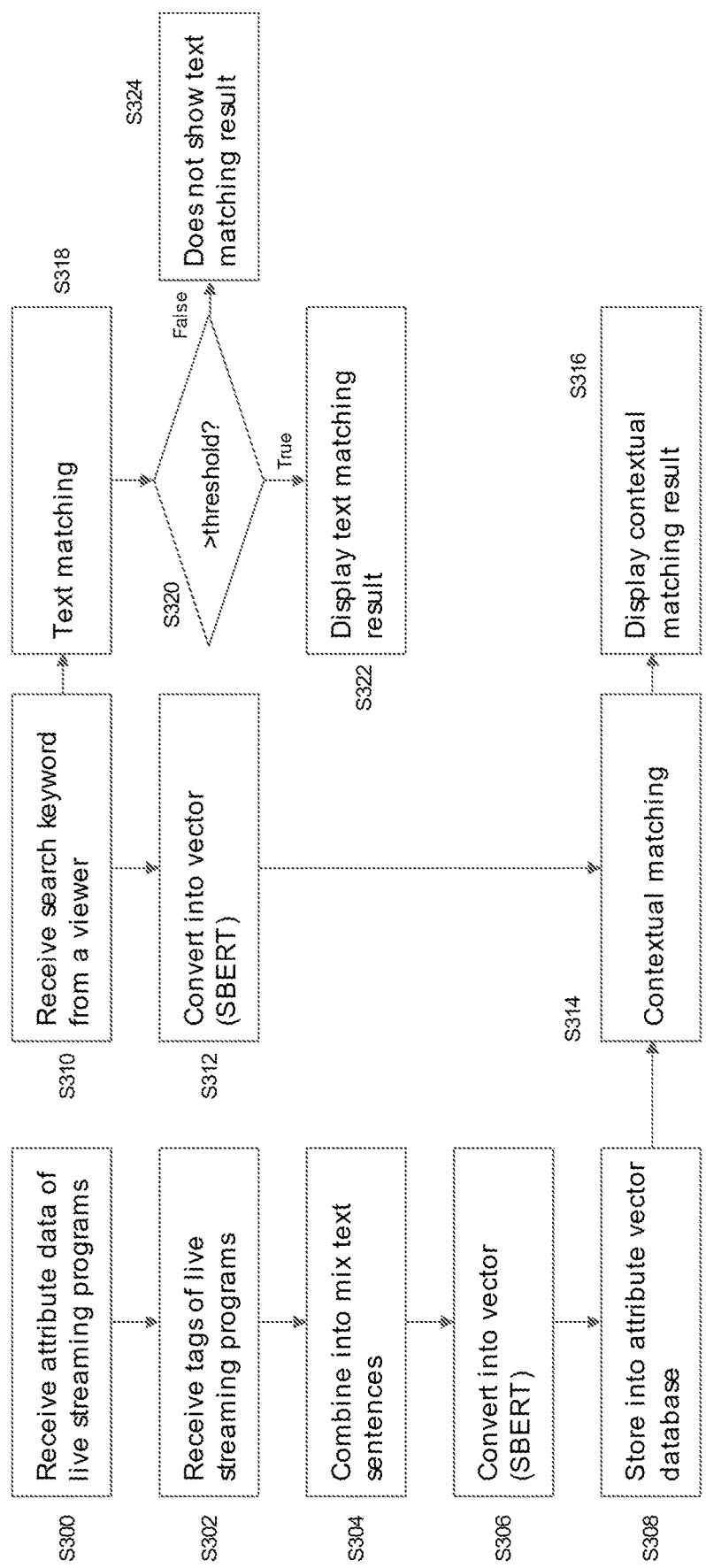
FIG. 3 shows an exemplary flow chart illustrating a method of data search in accordance with some embodiments of the present disclosure.

FIG. 3 shows an exemplary flow chart illustrating a method of data search in accordance with some embodiments of the present disclosure.

In step S300, attribute data (or attribute text) of available live streaming programs are received. For example, attribute texts are received at the receiving unit 304 from the attribute database 2020.

In step S302, tags of live streaming programs are received. For example, tags are received at the receiving unit 304 from the tag database 2022.

In step S304, one or more mix texts (or mix text sentences) are generated for each live streaming program. For example, each mix text is generated by combining the corresponding tag and the corresponding attribute text. The process may be performed by the mixing unit 306.

In step S306, each mix text is converted into vector-form. For example, each mix text is converted into an attribute vector by the converting unit 308 using a SBERT or a BERT model stored in the converting model database 200.

In step S308, the attribute vectors are stored into the attribute vector database 204.

In step S310, a search keyword is received. For example, a search keyword initiated by a viewer/user is transmitted from the viewer's user terminal to the receiving unit 302.

In step S312, the search keyword is converted into vector-form. For example, the search keyword is converted into a search vector by the converting unit 308 using a SBERT or a BERT model stored in the converting model database 200.

In step S314, contextual matching processes are performed between the search vector and the attribute vectors. The process may be performed by the contextual matching unit 310. Attribute vectors (and the corresponding live streaming programs) that best match the search vector would be identified (or determined/selected/received), by the contextual matching unit 310, for example.

In step S316, information of live streaming programs that match the search vector is provided/transmitted to the user terminal. The user terminal thereby displays the contextual matching result to the user.

In step S318, text matching processes are performed between the search keyword and the attribute texts received in step S300. The process may be performed by the text matching unit 312. Text matching or fuzzy text matching tools in Elasticsearch may be utilized, for example.

In step S320, for each attribute text, the text matching unit 312 compares the matching result (or matching score) with a threshold value. If there is an attribute text that results in a matching result greater than the threshold, the flow goes to step S322. If there is no attribute text that results in a matching result greater than the threshold, the flow goes to step S324. The threshold value can be determined according to practical applications, such as the number of live streaming programs to be presented, or the result of a user search feedback survey.

In some embodiments, attribute texts (and the corresponding live streaming programs) that best match the search keyword would be identified (or determined/selected/received), by the text matching unit 312, for example.

In step S322, information of live streaming programs, whose corresponding attribute texts result in text matching results greater than the threshold (in step S320), is provided/transmitted to the user terminal. The user terminal thereby displays the text matching result to the user. In some embodiments, contextual matching results displayed in step S316 and text matching results displayed in step S322 may share mutual live streaming programs. In some embodiments, contextual matching results displayed in step S316 and text matching results displayed in step S322 may deliver different live streaming programs.

In step S324, since no text matching result is greater than the threshold (in step S320), the text matching unit 312 determines that no text matching is reached for all attribute texts. Therefore, the user terminal will not display any text matching result to the user.

In some embodiments, information of live streaming programs determined by text matching and information of live streaming programs determined by contextual matching are provided simultaneously to the user terminal. In some embodiments, information of text matching result and information of contextual matching result are configured such that live streaming programs determined by text matching and live streaming programs determined by contextual matching can be displayed simultaneously on the user terminal initiating the search request.

The threshold setting in the text matching may serve as a mechanism of user intention confirmation.

If the text matching between the search keyword and a specific attribute text (such as streamer name or streamer ID) has a result (or score) greater than the threshold value, it is determined that the user may have the intention to search for that attribute text, and therefore the corresponding live streaming program (based on the text matching result) is shown to the user.

If the text matching between the search keyword and all attribute texts cannot deliver a result (or score) greater than the threshold value, it is determined that the user may not have the intention to search for any specific attribute text (such as any streamer name or streamer ID). That is, if all text matching results are less than the threshold value, it is determined that the user may not try to search for a specific live streaming program, instead, the user may search for live streaming programs related to the search keyword. Therefore, in this case, only live streaming programs that are delivered based on the contextual matching result are shown to the user.

Figure 4:
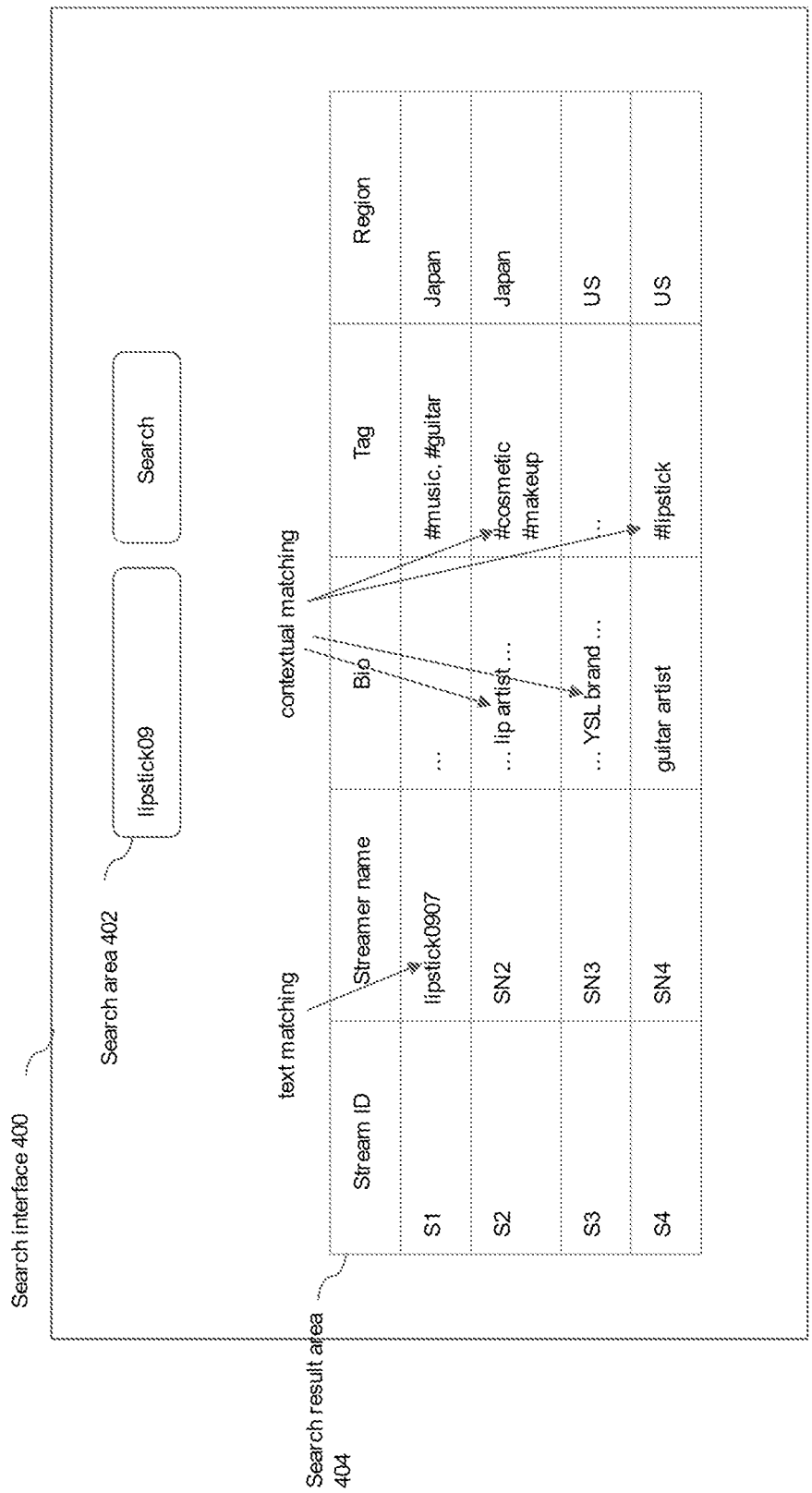
FIG. 4 shows an exemplary search interface in accordance with some embodiments of the present disclosure.

FIG. 4 shows an exemplary search interface in accordance with some embodiments of the present disclosure.

The search interface 400 may be a search interface (or a page) of a live streaming application wherein the viewer can input a search keyword to search for live streaming programs. The viewer inputs the search keyword in the search area 402. After clicking the search button, the search result will be shown in the search result area 404.

As shown in FIG. 4, the input search keyword is "lipstick09." Because there is only one search area 402 in the interface, we don't know if the user is trying to search for a specific live streaming program (or a specific streamer), or if the user is trying to search for live streaming programs related to the keyword. Therefore, the search result area 404 shows both the text matching result (live streaming program S1) and the contextual matching results (live streaming programs S2, S3 and S4).

The live streaming program S1 is delivered as a text matching result. The streamer name "lipstick0907" (which is one attribute text of streaming program S1) results in a high text matching degree (or high matching correlation/high text matching score) with the keyword "lipstick09." The system therefore determines that the user may try to find the specific live streaming program S1. Note that in this case, the bio or tag ("music" and "guitar") of S1 shows nothing related to "lipstick". But due to the high text matching degree, the live streaming program S1 is still delivered.

The live streaming program S2 is delivered as a contextual matching result. The bio contains the text "lip artist" and the tag contains the texts "cosmetic" and "makeup". In the search process, those texts are merged into a mix text, and then be converted into an attribute vector (with a BERT model, for example), and then be matched (with a KNN search process, for example) with a search vector converted from the search keyword. The texts ("lip artist", "cosmetic" and "makeup") are contextually related to the keyword "lipstick09", therefore the contextual matching results in a high-correlation result. Therefore, the live streaming program S2 is delivered.

The live streaming program S3 is delivered as a contextual matching result for similar reasons as the live streaming program S2. The text "YSL brand" in the bio is contextually matched with the search keyword (YSL is a lipstick brand). In this embodiment, the program S2 has higher rank than the program S3 due to more contents contextually matched with the search keyword.

In some embodiments, contents or texts in different categories may be given different weights in determining the matching degree (or matching score). The contents in "Bio" may represent general or long-term style/type of the program, while the contents in "Tag" may represent real time or short-term style/type of the program. In some embodiments, contents in "Bio" may be given more weight than contents in "Tag", because we want to deliver the programs with general features matching with the user's search. In some embodiments, contents in "Tag" may be given more weight than contents in "Bio", because we want to deliver the programs with contents best matching with the user's search at that exact timing.

The live streaming program S4 is delivered as a contextual matching result. Although from the bio we know the program is mainly about guitar play, the real time generated tag "lipstick" (could be generated by sound recognition, image recognition or motion recognition, for example) indicates that some contents related to lipstick is shown or mentioned in the program at the search timing. The real time contextual matching method of the present disclosure can discover contents that are contextually related to the search keyword but cannot be found with conventional text matching method.

FIG. 5 shows an exemplary search interface in accordance with some embodiments of the present disclosure. FIG. 5 is similar to FIG. 4 except that the text matching result and the contextual matching result are displayed separately in different areas.

FIG. 6 shows an exemplary data structure in accordance with some embodiments of the present disclosure.

In this embodiment, attribute texts received by the receiving unit 304, such as streamer name, region, bio and gender, are stored in the mix text table 316. Tags received by the receiving unit 304 are stored in the mix text table 316. The mix text generated by the mixing unit 306 with the above contents is stored in the mix text table 316. In this embodiment, the mix text is a straight alignment of the attribute texts and the tags.

The attribute vector converted from the mix text by a SBERT model is stored in the attribute vector database 204. Because the vector conversion is done by a SBERT model, the attribute vector has the dimension of 384×1.

Figure 7:
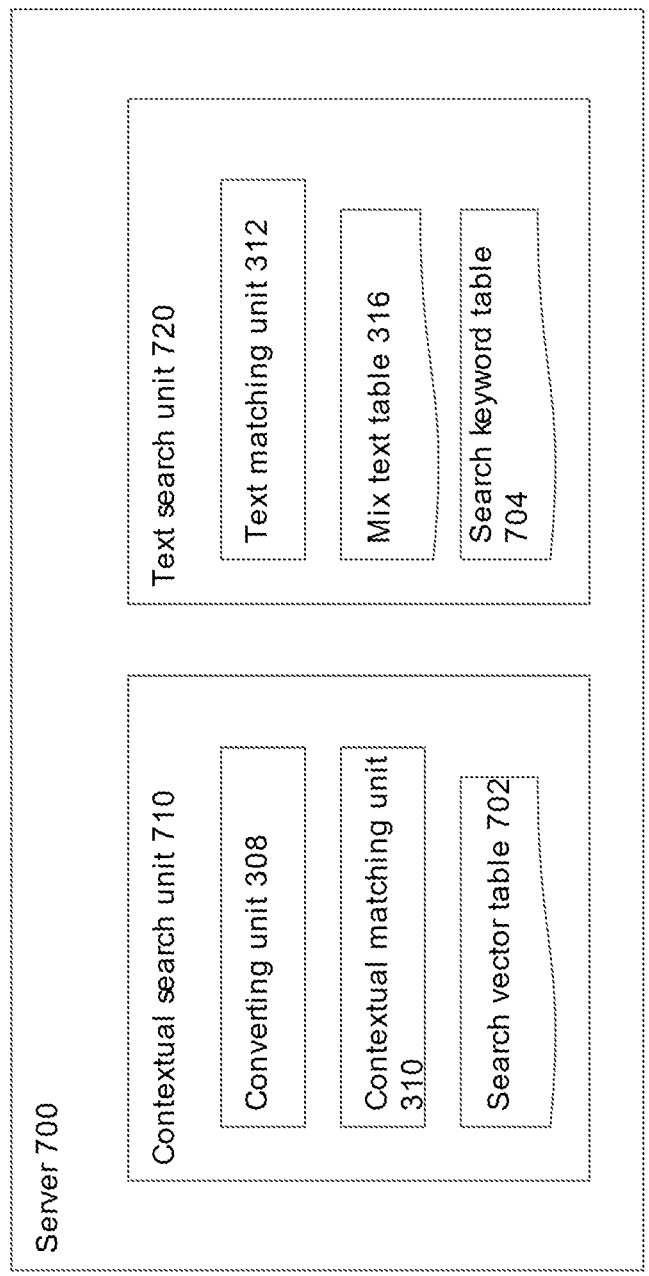
FIG. 7 shows an exemplary block diagram of a server in accordance with some embodiments of the present disclosure.

FIG. 7 shows an exemplary block diagram of a server in accordance with some embodiments of the present disclosure. The server 700 includes a contextual search unit 710 and a text search unit 720.

The contextual search unit 710 is configured to perform processes related to contextual searching or contextual matching. The contextual search unit 710 includes the converting unit 308, the contextual matching unit 310, and a search vector table 702. The search vector table 702 is configured to store the search vector converted from the search keyword by the converting unit 308. The search vector is then accessed by the contextual matching unit 310 for matching with attribute vectors of live streaming programs stored in an attribute vector database.

The text search unit 720 is configured to perform processes related to text searching or text matching. The text search unit 720 includes the text matching unit 312, the mix text table 316, and a search keyword table 704. The search keyword table 704 is configured to store the search keyword received from a user terminal. The search keyword is then accessed by the text matching unit 312 for matching with text contents in the mix text table 316. The text contents may include attribute texts or real time tags of live streaming programs.

FIG. 8 shows an exemplary search interface in accordance with some embodiments of the present disclosure. FIG. 8 is similar to FIG. 5 except that the text matching does not deliver any live streaming programs. In this embodiment, there is no live streaming program whose attribute text can result in a text matching degree (or text matching score) greater than the threshold. Therefore, only contextual matching results are shown.

The present disclosure discloses methods for real time contextual search and real time text search. Live streaming programs with real time contents matching with the search request can be delivered. Contextual search result and text search result are delivered together to further ensure that the contents that meet the user's search intent can be delivered. Utilizing mix texts, which are formed by attributes texts and/or real time tags of live streaming programs, can achieve a more comprehensive and dynamic contextual search result.

The processing and procedures described in the present disclosure may be realized by software, hardware, or any combination of these in addition to what was explicitly described. For example, the processing and procedures described in the specification may be realized by implementing a logic corresponding to the processing and procedures in a medium such as an integrated circuit, a volatile memory, a non-volatile memory, a non-transitory computer-readable medium and a magnetic disk. Further, the processing and procedures described in the specification can be implemented as a computer program corresponding to the processing and procedures, and can be executed by various kinds of computers.

Furthermore, the system or method described in the above embodiments may be integrated into programs stored in a computer-readable non-transitory medium such as a solid state memory device, an optical disk storage device, or a magnetic disk storage device. Alternatively, the programs may be downloaded from a server via the Internet and be executed by processors.

Although technical content and features of the present invention are described above, a person having common knowledge in the technical field of the present invention may still make many variations and modifications without disobeying the teaching and disclosure of the present invention. Therefore, the scope of the present invention is not limited to the embodiments that are already disclosed, but includes another variation and modification that do not disobey the present invention, and is the scope covered by the patent application scope.

LIST OF REFERENCE NUMBERS

1 Communication system
10 User terminal
30 Backend server
40 Streaming server
90 Network
200 Converting model database
202 Streaming database
2020 Attribute database
2022 Tag database
204 Attribute vector database
206 Tag generating unit
300 Server
302 Receiving unit
304 Receiving unit
306 Mixing unit
308 Converting unit
310 Contextual matching unit
312 Text matching unit
314 Transmitting unit
316 Mix text table
S300, S302, S304, S306, S308, S310, S312, S314, S316, S318, S320, S322, S324 Step
S1, S2, S3, S4 Live streaming programs
SN2, SN3, SN4 Streamer name
700 Server
702 Search vector table
704 Search keyword table
710 Contextual search unit
720 Text search unit

What is claimed is:

1. A method for live streaming data search, comprising:
receiving a search word;
converting the search word into a search vector;
receiving tags of a first live streaming program, wherein the tags are dynamically generated in real time according to contents of the first live streaming program while the first live streaming program is being distributed;
receiving an attribute text corresponding to the first live streaming program;
combining the tags and the attribute text into a mix text;
converting the mix text to an attribute vector with a BERT model;
receiving the attribute vector matching the search vector;
providing information of the first live streaming program corresponding to the attribute vector;
matching the search word with an attribute text corresponding to a second live streaming program, wherein the second live streaming program is same as or different from the first streaming program;
determining a matching result of the matching between the search word and the attribute text of the second live streaming program to be greater than a threshold value; and
providing information of the second live streaming program simultaneously with the first live streaming program,
wherein the attribute vector varies according to contents of the first live streaming program while the first live streaming program is being distributed.

2. The method according to claim 1, wherein the converting the search word into the search vector includes a BERT word embedding process.

3. The method according to claim 1, wherein the matching between the search vector and the attribute vector includes a KNN search process.

4. The method according to claim 1, further comprising:
generating the tags of the first live streaming program with an image recognizing process, a motion recognizing process or a sound recognizing process.

5. The method according to claim 1, wherein the information of the first live streaming program and the information of the second live streaming program are configured to display the first live streaming program and the second live streaming program simultaneously on a user terminal, wherein the search word is received from the user terminal.

6. A system for live streaming data search, comprising one or a plurality of processors, wherein the one or plurality of processors execute a machine-readable instruction to perform:
receiving a search word;
converting the search word into a search vector;
receiving tags of a first live streaming program, wherein the tags are dynamically generated in real time according to contents of the first live streaming program while the first live streaming program is being distributed;
receiving an attribute text corresponding to the first live streamlining program;
combining the tags and the attribute text into a mix text;
converting the mix text to an attribute vector with a BERT model;
receiving the attribute vector matching the search vector;
providing information of the first live streaming program corresponding to the attribute vector;
matching the search word with an attribute text corresponding to a second live streaming program, wherein the second live streaming program is same as or different from the first streaming program;

determining a matching result of the matching between the search word and the attribute text of the second live streaming program to be greater than a threshold value; and providing information of the second live streaming program simultaneously with the first live streaming program, wherein the attribute vector varies according to contents of the first live streaming program while the first live streaming program is being distributed.

7. A non-transitory computer-readable medium including a program for live streaming data search, wherein the program causes one or a plurality of computers to execute:

receiving a search word;

converting the search word into a search vector;

receiving tags of a first live streaming program, wherein the tags are dynamically generated in real time according to contents of the first live streaming program while the first live streaming program is being distributed;

receiving an attribute text corresponding to the first live streaming program;

combining the tags and the attribute text into a mix text;

converting the mix text to an attribute vector with a BERT model;

receiving the attribute vector matching the search vector;

providing information of the first live streaming program corresponding to the attribute vector;

matching the search word with an attribute text corresponding to a second live streaming program, wherein the second live streaming program is same as or different from the first streaming program;

determining a matching result of the matching between the search word and the attribute text of the second live streaming program to be greater than a threshold value; and providing information of the second live streaming program simultaneously with the first live streaming program, wherein the attribute vector varies according to contents of the first live streaming program while the first live streaming program is being distributed.

* * * * *